United States Patent [19]

Bobard et al.

[11] 4,241,569
[45] Dec. 30, 1980

[54] GRAPE GATHERING MACHINE

[75] Inventors: Charles E. Bobard, Beaune; Just M. Delaunay, Gevrey-Chambertin; Raymond M. Darcy, Beaune, all of France

[73] Assignee: Etablissements Bobard Jeune, Beaune, France

[21] Appl. No.: 754,747

[22] Filed: Dec. 27, 1976

[30] Foreign Application Priority Data

Dec. 29, 1975 [FR] France .................. 75 39936

[51] Int. Cl.³ .................................. A01G 19/00
[52] U.S. Cl. ............................................. 56/330
[58] Field of Search ............ 56/330, 33, 34, 35, 56/130, 30

[56] References Cited

U.S. PATENT DOCUMENTS

| | | | |
|---|---|---|---|
| 2,489,963 | 11/1949 | Henley | 56/30 |
| 3,385,042 | 5/1968 | Christie et al. | 56/330 |
| 3,579,971 | 5/1971 | Sagouspe et al. | 56/330 |
| 3,590,566 | 7/1971 | Cutts, Sr. et al. | 56/330 |
| 3,601,964 | 8/1971 | Fisher et al. | 56/330 |
| 3,601,965 | 8/1971 | Kaessbohrer et al. | 56/330 |
| 3,901,005 | 8/1975 | Rohrbach et al. | 56/330 |

FOREIGN PATENT DOCUMENTS

| | | | |
|---|---|---|---|
| 2248779 | 5/1975 | France | 56/330 |
| 2287841 | 5/1976 | France | 56/330 |

*Primary Examiner*—Robert A. Hafer
*Attorney, Agent, or Firm*—Darby & Darby

[57] ABSTRACT

A mechanical grape harvesting machine including two symmetrical supports arranged face to face and adapted to be disposed on either side of the same row of vines. Each support has one or more comb units carrying at least one flexible blade and pairs of flexible flaps adapted to be close to the vegetation which passes inside each support as the machine is moved. Receptacles or conveyers are placed at the bottom of the machine and ventilators are provided for creating an ascending air flow inside the almost tight enclosure defined by each support and its flaps.

39 Claims, 13 Drawing Figures

GRAPE GATHERING MACHINE

The present invention relates to a machine for the mechanical harvesting of grapes.

Various grapes gathering machines are already known comprising a tunnel defining structure carried under a high-clearance tractor inside which are threshing and shaking means for pulling off the grape berries. The tunnel defining structure is closed at its base by two rows of inclined aprons overlapping and facing each other. The grape berries and the grape juice drops run along said aprons and fall onto two chutes inside each of which is a conveyance device for removing the crop. Ventilators are placed along the crop evacuation path for removing the loose leaves which were pulled off with the grape berries.

All these machines are very complicated and their dimensions very critical so that on the one hand they can be used only on large plots and on the other hand they are extremely costly.

It is also known to traverse a row of grape vines with a reversed U-shaped support comprising two symmetrical assemblies of rotating flexible blades placed on either side of the grape vine row so that when the blades perform their rotating movement, they strike the mass of leaves and fruits from bottom to top. The result is that not only grape berries but also entire clusters of grapes are pulled off. Preferably, the support is placed under partial vacuum by means of a ventilator for sucking off and throwing outside the leaves pulled off by said flexible blades. The grape berries and clusters of grapes are removed by means similar to those previously described.

In comparison with the prior devices, the rotating blade device offers the advantage of being able to be constructed in small dimensions and thereby be carried either under a conventional type high-clearance tractor or even by an inter-row vineyard tractor which may be more accessible to standard size farms. Yet it turns out in use that the harvesting of the crop in such a way is not complete since a notable proportion of berries are not pulled off. Further, the grape berries are too roughly handled and burst, thereby causing an important loss of juice. In addition, an abnormal quantity of leaves is pulled off.

The present invention relates to a grape gathering machine comprising picking members made of flexible blades. The machine according to the invention includes at least one support mounted to a vehicle inside which passes the vegetation and whose forward and rear vertical openings and the horizontal lower opening are closed off by flexible flaps in order to define a chamber as tight as possible while letting the vegetation, vines and stakes freely pass through. There is also provided at least one ventilator creating a preferably ascending air flow in said enclosure and at least one comb placed inside of said support. A comb includes at least one flexible blade, and said combs are driven by a mechanism imparting to them a movement during which said blades describe a closed curve in a vertical plane substantially perpendicular to the row of vines, moving up in the part of their path closest to the vegetation, then moving down in the part furthest from said vegetation. There is at least one collector or conveyor placed at the lower portion of said support and at least one adjustable pad integral with said support and guiding on the vines or the stakes.

According to the thickness of the vegetation, the machine may comprise either two supports facing each other on either side of the same row of vines, or one support applied to one row of vines, or alternatively two opposite supports applied to two rows of vines.

The invention will become more apparent from the following example which is not to be construed as limitative, reference being made to the accompanying drawings wherein.

Figure 1:
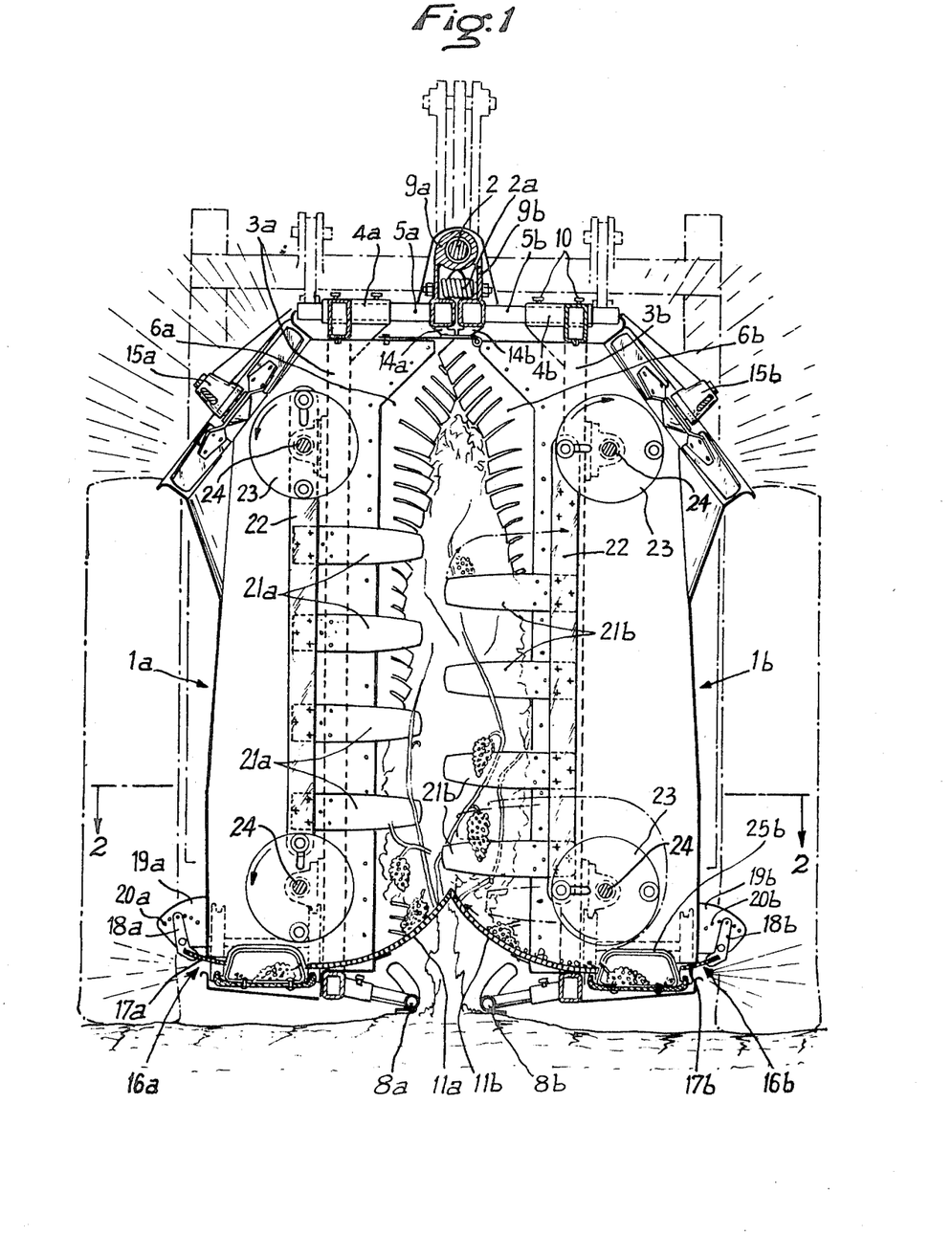
FIG. 1 is a front view of a first embodiment according to the invention partly broken away and partly in section alone lines 1—1 of FIG. 1.
Figure 2:
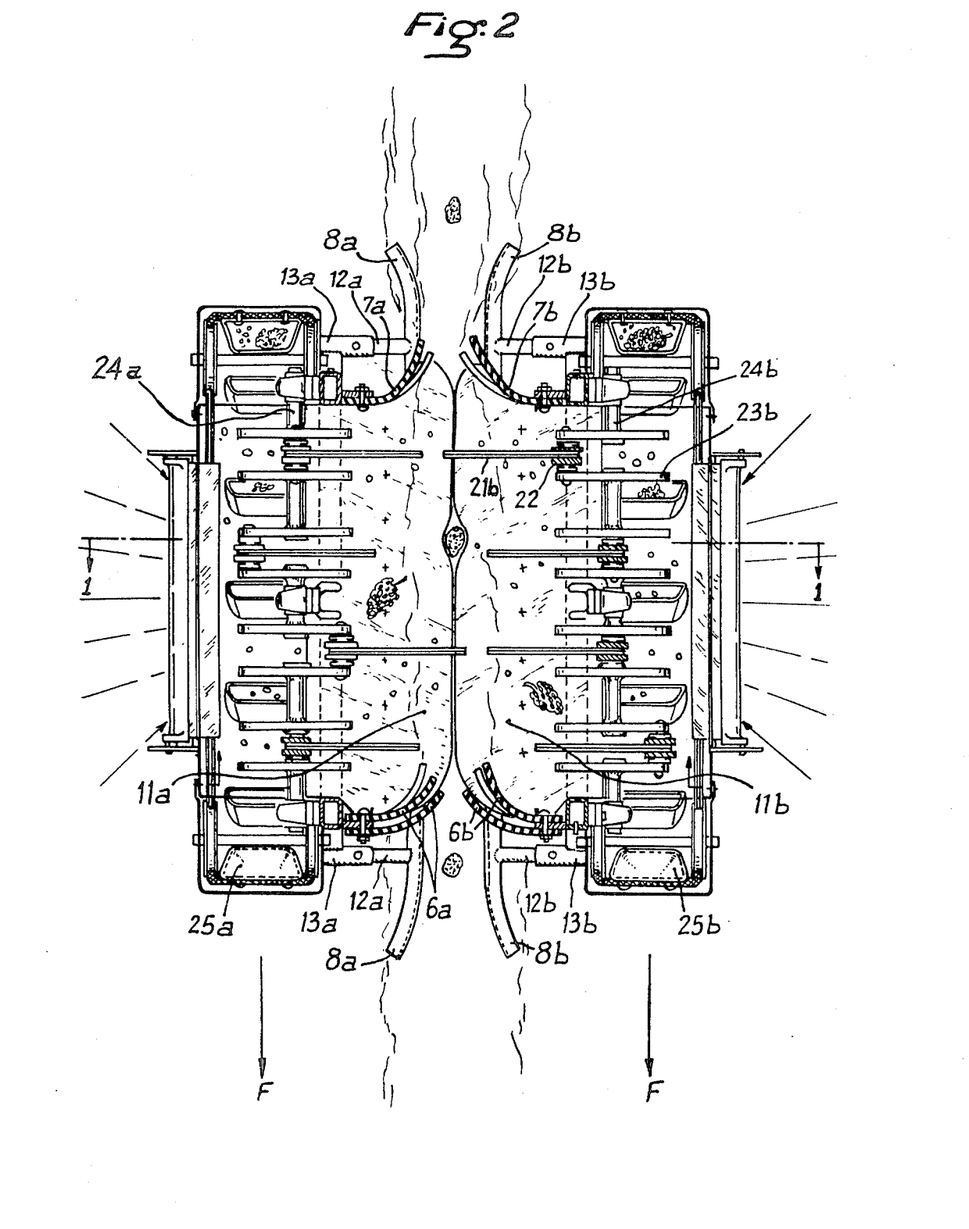
FIG. 2 is a top view of the machine of FIG. 1 broken away along lines 2—2 of FIG. 1 looking in the direction of the arrows.

Reference being made to FIGS. 1 and 2, it may be seen that according to a first embodiment, the grape harvesting machine comprises two supports 1a and 1b which are symmetrical and placed face to face.

Said two supports, or support housings 1a and 1b, define an enclosure which should be made as tight as possible with respect to a row of grape vines to be traversed.

To this effect, the forward and rear openings through which the vines pass as the machine supports move along the row of vines, are closed off by flexible flaps, designated 6a and 6b for the respective supports 1a and 1b for the inlet opening (in front in the direction of movement of the machine) and by similar flaps, designated 7a and 7b, for the outlet opening (at the rear). The lower portions of the face to face supports are provided with flexible flaps 11a and 11b which extend generally upwardly in an arc.

In the illustrated example (FIG. 2), the inlet flexible flaps 6a and 6b are double. The reason is that they not only provide a sealing capacity but their function is also to damp the vibrations taking place in the vegetation at the front of the machine.

Preferably, flaps 6a, 6b and 7a, 7b are formed with slits, forming smaller sections, in order to better conform to the contour of the vegetation mass moving into and out of the enclosure defined by the two supports. The edge portions of the two lower flaps 11 are contiguous (FIG. 1) and offer a resilient resistance strong enough to have a tendency to remain contiguous and to be forced apart only when they give way to hard obstacles such as vines and stakes.

The two support housings 1a and 1b are hung in pendulum fashion for movement about a support member 2. To this effect, each support is carried by a respective frame 3a or 3b integral with a respective sleeve 4a or 4b which can slide on a respective cross-beam 5a or 5b integral with a yoke-joint 9 pivotally mounted on said support member 2. Sleeves 4a, 4b include a locking or securing means 10 so that the spacing between both support housings 1a, 1b may be adjusted in accordance with the thickness of the vegetation.

Both support housings 1a and 1b are permanently maintained close to each other by a spring 2a in tension which is connected to the cross-beams 5a, 5b, the limit position being determined by two abutments 14a and 14b.

At the base of each frame 3a, 3b is connected a respective padded elongated guide 8a, 8b. Each pad 8a, 8b is supported by a respective arm 12a, 12b slidably mounted inside a respective tube 13a, 13b integral with frame 3 so that the lower spacing between the two support housings 1a and 1b may also be adjusted in accordance with both the thickness of the vegetation and the thickness of the vines.

The support member 2 may be defined by any appropriate structure. In the example shown in FIG. 1, said support member 2 is carried by a high-clearance tractor represented schematically in chain-dot lines. This example is not limiting and support member 2 may be integral with the frame carried laterally by a vineyard tractor travelling between two vine rows.

The combined play of the pendulum suspension of both support housings 1a, 1b and the lower guiding by lateral pads 8a, 8b causes the whole unit to exactly track the vegetation as the machine is pulled along a row.

Each support housing 1a or 1b includes on the one hand at its upper portion a suction ventilator 15a or 15b placed in an opening of corresponding diameter. Provided at its lower end is an air-intake opening 16a or 16b partially closed off by a shutter flap 17a or 17b.

Preferably and as is shown in FIG. 1, each opening 16a, 16b is formed as a horizontal slot extending along the entire length of a support in the immediate vicinity of its base. Each shutter flap 17a, 17b is of a curved shape and, for example of a flexible material. Each shutter flap is carried by a tipping lever 18a or 18b movable along a section plate 19a or 19b fixed on the support housings 1a, 1b and which may be locked in any required angular position by means of holes.

When the two ventilators 15a and 15b are operating, air flows through the lower openings 16a and 16b and flows upwards through the enclosure defined by the support housings 1a, 1b until it goes out of the openings in which the ventilators are located.

Each support housing carries a plurality of members for penetrating the vegetation mass by moving into said mass, moving upwards within said mass and then away from it, with the members remaining parallel to themselves. Said penetrating members include a plurality of horizontally flexible blades 21, designated 21a and 21b, in the respective support housings 1a and 1b which are mounted to and carried by a vertical connecting rod 22. Rod 22 is rotatably mounted at each of its ends at the periphery of a respective disc 23 by two crank-pins placed in slots which permit adjustment of the distance between a crank-pin and the rotation center of disc 23 and therefore the movement amplitude of each connecting rod 22.

Each connecting rod 22 with its blades 21 forms a comb. Preferably, the blades 21 are made of a flexible and resilient material yet maintaining some rigidity, particularly in the vertical directions. The construction of such blades is described in my co-pending application Ser. No. 754,748, filed Dec. 27, 1976. As an example, these blades may have a thickness of 1 cm, a width of 5 cm and a length of 25 cm. Each support housing includes a plurality of these combs carried by discs 23 mounted on a respective common axis formed by a segmented crankshaft 24, designated 24a, 24b.

Reference being made to the example described in FIGS. 1 and 2, it may be seen that each connecting rod 22 carries four blades 21. Each crankshaft 24 is supported on three bearings and carries four pairs of discs 23. Each pair of discs has a connecting rod connected thereto so that each support includes four combs of four blades. The blades are set off at angles of about 90°, that is, the blades of each comb are offset by about 90° from the blades of the adjacent comb with respect to their position during a cycle of movement of the blades of a comb.

Each blade 21 travels a path of a generally circular and lateral movement. During said movement, it penetrates the vegetation by moving upwards, then it withdraws from the vegetation during this upward movement; and thereafter it moves downward while drawing away and then coming nearer to the vegetation.

Preferably, the diameter of the discs 23 and the length of the blades 21 are determined so that the blades be disengaged from the vegetation during their downward movement, and remain in the vegetation mass during their upward movement. The position of blades 21 in relation to a respective connecting-rod 22 may be modified by providing on each blade several securing holes along its length for attachment to the rod.

Likewise, the lowest position of each lower blade 21 is selected so that the tip of said blade will move substantially tangent to the surface of the lower flap 11a, 11b during the first part of its upward movement. Therefore, when a respective flap 11a or 11b is twisted by the passage of an obstacle, said lower blade has a tendency to engage the flap and make it resume its normal position at each passage.

During their movement, the blades penetrate the vegetable mass and serve to detach not only the grape berries but also entire clusters of grapes whose peduncle is broken by said blades. The grape clusters and berries fall onto the flap-chutes 11a or 11b and roll down to the base of the support where they move onto bucket-conveyor 25a or 25b of known type which carries away the gathered crop. The leaves which come loose are sucked and ejected by ventilators 15 before having a chance to become mixed with the crop, thereby avoiding that they be covered with juice. The buckets of conveyers 25 may be dismountable receptacles.

Moreover, a great part of the air flowing through support housings 1a and 1b originally moves through openings 16 which are situated just above the conveying system, with an effect such that leaves near the conveyer are eliminated.

Figure 3:
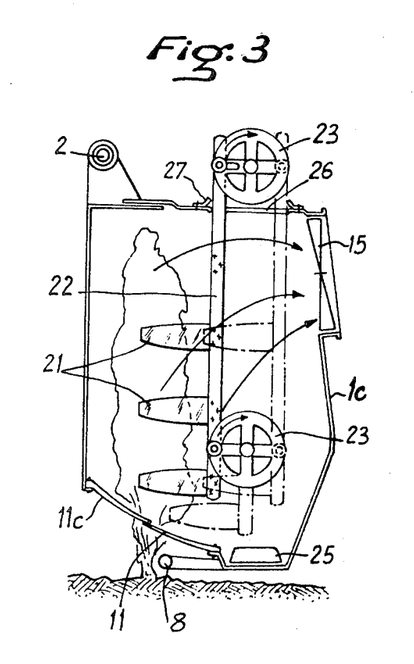
FIG. 3 is a schematic view of a second embodiment according to the invention.

FIG. 3 shows a second embodiment according to the invention wherein the same elements are designated by the same reference numerals. Reference being made to said figure, it may be seen that the machine comprises a single support 1 inside of which is a single row of combs formed of connecting rods with corresponding blades 21 so that the row of vines is explored by said combs on one side only.

According to this embodiment, support housing 1c is hung in pendulum fashion on support member 2 which is off-set laterally so that support housing 1c has a tendency to tip and thereby provide constant contact for the single padded member 8 against the vines.

Support housing 1c includes one conveyer 25 only and it is therefore necessary that flaps 11 should not be symmetrical as is the case in FIGS. 1 and 2, but instead define a continuous oblique plane (11 and 11c) so that the individual berries which fall on either side of the row of vines may roll or slide to the single conveyer 25, the extremity of flap 11c being above the extremity of flap 11.

In FIGS. 4 to 13, the elements identical or similar to those described in the previous figures are designated by the same reference numerals.

Figure 4:
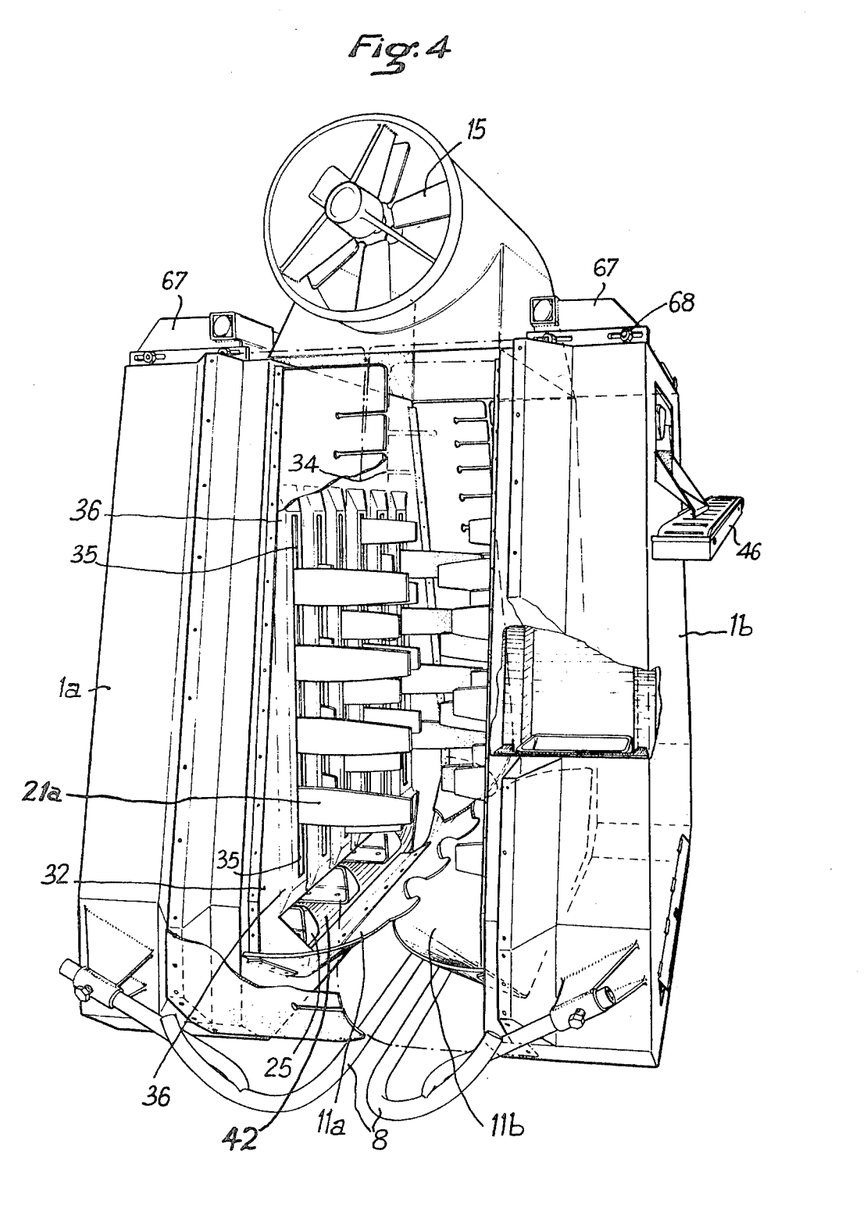
FIG. 4 is a perspective view with parts broken away of a third embodiment.
Figure 5:
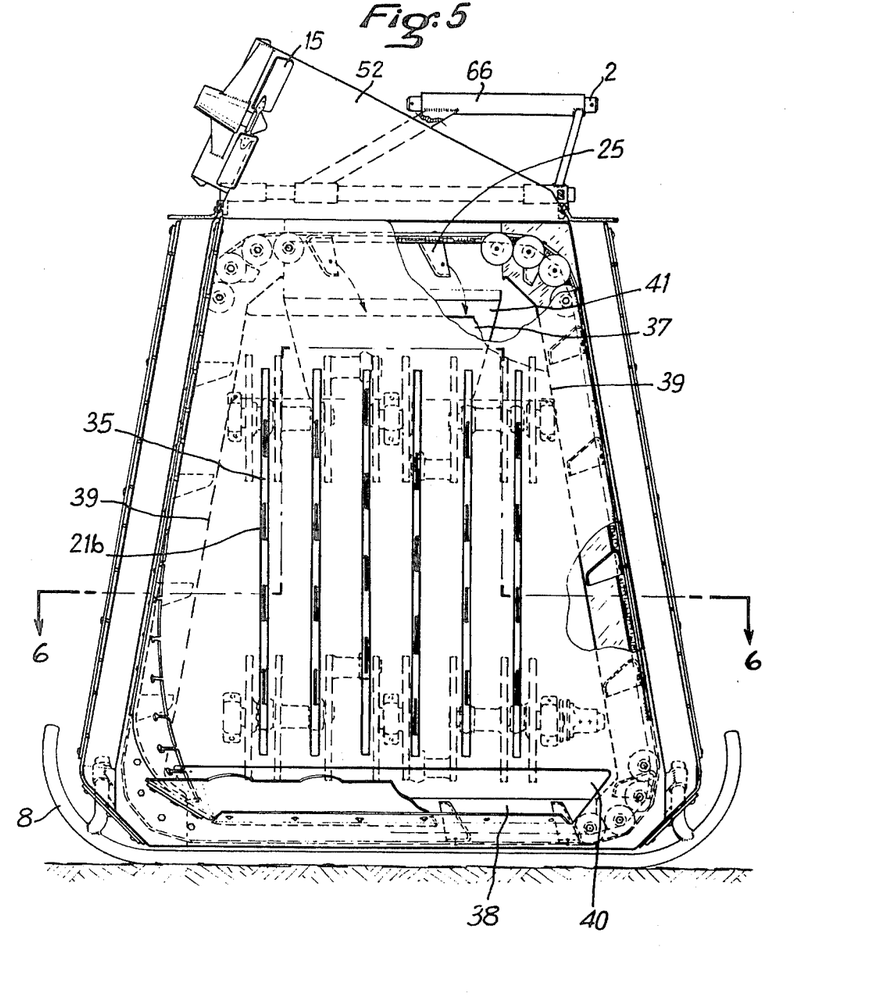
FIG. 5 is a sectional view of FIG. 1 along the longitudinal vertical plane.
Figure 6:
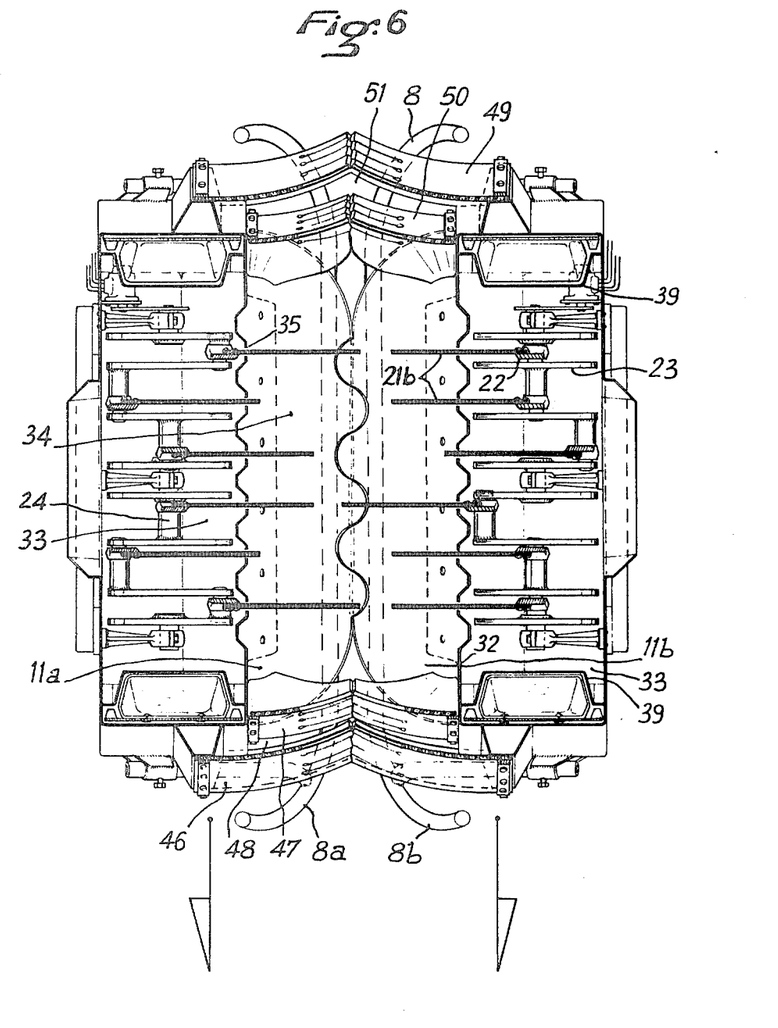
FIG. 6 is a sectional top view along lines 6—6 of FIG. 5.

Reference being made to FIGS. 4 to 6, it may be seen that according to a further embodiment of the invention, each of the support housings 1a and 1b includes an inner wall 32, preferably of stainless steel, which with the outer wall of the respective support defines a chamber 33 (FIG. 6) inside of which are the connecting-rods carrying the flexible blades 21, as well as discs 23, shafts 24 and bearings carrying the braces formed by said members 23 and 24.

Blades 21 protrude inside enclosure 34 formed between the two inner walls 32 by means of vertically disposed slots 35 formed in said walls 32. Preferably, the vertically disposed slots 35 are formed in longitudinal ribs 36 which reinforce the rigidity of the walls 32 and also form vertical channels therebetween for a better upward conveyance of the loose leaves.

This arrangement prevents the mechanical parts from being soiled by the grape juice, that loose leaves pile up and clog the moving mechanical parts or even that ends of branch tendrils cling to and/or coil around the moving parts, which would cause damage to the vines which might be broken or pulled out.

Although this is not represented in FIG. 6, it may be possible to incorporate guides on the rear face of ribs 36 in order to avoid that when contacting a hard obstacle, for instance a stake, the blade or blades will fold in and should pass behind wall 32.

Figure 7:
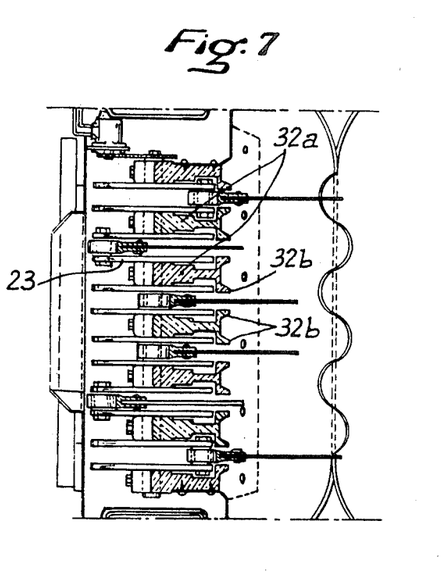
FIG. 7 is a partial view corresponding to FIG. 6 of an alternative embodiment.
Figure 8:
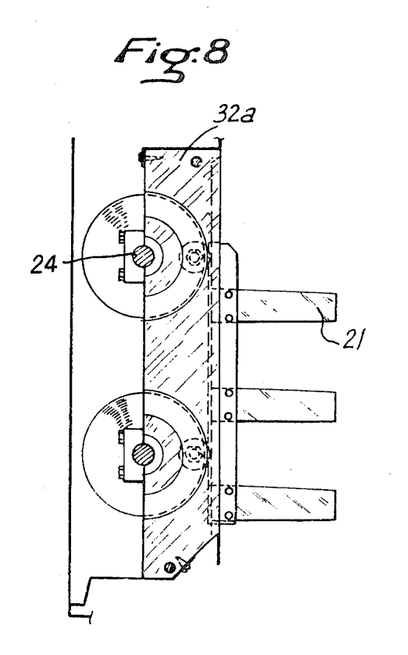
FIG. 8 is a partial side elevation view of the alternative of FIG. 7.

FIGS. 7 and 8 show an alternative embodiment of wall 32. According to this alternative, wall 32 is replaced by a plurality of boards 32a, for instance made of wood, which are vertical and parallel to each other. Said boards 32a have spaces therebetween in which are accommodated discs 23. The forward lateral edges 32b of two adjacent boards define a vertically disposed slot corresponding to slots 35 of FIGS. 4–6 so that the blades are guided between the discs and the board edges. As illustrated in FIG. 8, boards 32a may be used as supports for the bearings of the crankshaft 24 of discs 23.

Considering FIGS. 4 to 9, and more particularly FIG. 5, it may be seen that support housings 1a and 1b may have a trapezoidal shape such that their base is larger than their top.

It may also be seen that the bucket-conveyers 25 are arranged so that they completely circumscribe the mechanism driving the combs.

On the other hand, the support walls are arranged so that the bucket-conveyors 25 are isolated from enclosure 33 in which are situated the mechanical means driving the flexible blades. To this effect, the inside of each support housing includes (FIG. 9) a downwardly inclined upper wall 37, a lower wall 38 and two side oblique walls 39 (FIG. 5), forming a sort of annular sub-compartment isolating the path of the bucket-conveyers from the enclosure 33 in which are located the comb driving mechanisms.

Preferably, and as is shown in FIG. 5, walls 39 assume the shape of the endless bucket-conveyers 25 in order to form side shafts or areas in which the bucket conveyers travel or more, the shafts being closed off by said bucket conveyers so that air practically cannot flow through them.

The outer wall of the support is formed at its base with an opening 40 disposed at the same height as the bucket-conveyers 25 and with an upper opening 41, wall 37 forming the lower wall of this opening and protruding outside beyond the support housing. As support housing 1 has a trapezoidal shape, opening 40 is longer than opening 41. Moreover, opening 40 extends along practically the whole length of the lower path of the conveyer 25.

The result is that the inlet air-flow crosses the lower path of the buckets at an angle of 90° and carries away the leaves which might be therein. The air-flow penetrates entirely into the enclosure through opening 42 (FIG. 4) situated at the bottom of wall 32 so that a part of this flow passes in the lateral compartments. There is therefore no air loss and the best efficiency is obtained.

Figure 9:
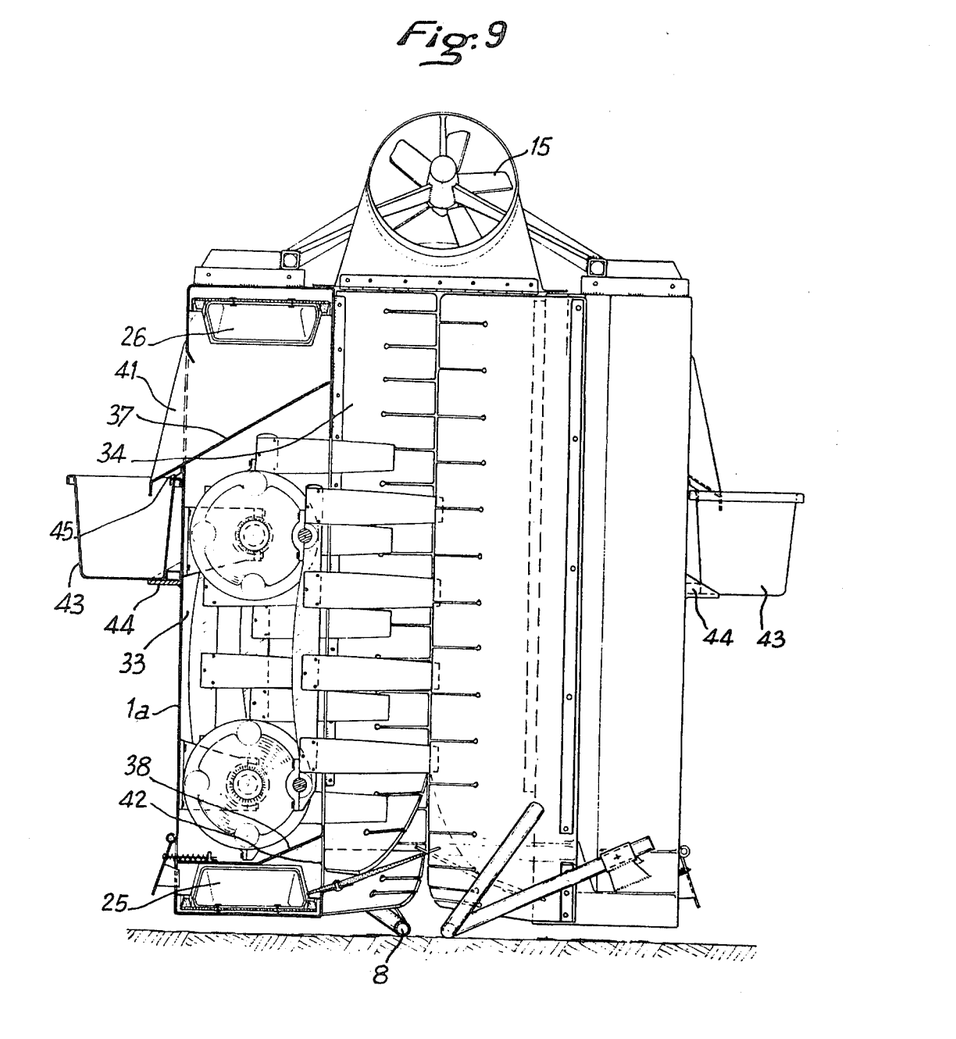
FIG. 9 is a partial front sectional view of the machine shown in FIGS. 4 to 6.

The clusters of grapes and the grape berries are carried upward by the buckets in one of the oblique ducts and fall from the buckets onto the upper horizontal part of the path of said buckets (FIG. 5). From there, they fall onto the inclined wall 37 which moves them to the outlet opening 41. Below this outlet opening may be placed either a conveyer-belt or a similar system of known type 46, as is shown in FIG. 4, or removable baskets 43 as is shown in FIG. 9. Containers 43 are placed on shelf supports 44 integral with the support and maintained in position by hooks 45.

With vines planted on small plots, that is where the rows are short, it is therefore possible to put the empty containers 43 at the beginning of the rows, and to remove them at the end of the rows in order to put them on the platform of a trailer and replace them by other empty baskets or by emptying them into a cart. This arrangement avoids overloading the machine with conveyers of the type of the 46 conveyer which requires also a reception bucket for the crop, said bucket being provided with tipping means in order to empty it.

It is thereby possible to construct a far less complicated and costly machine than the machines currently built and therefore within the reach of small wine growers, which is at present not the case.

According to another improvement, the vertical openings in the front and rear of enclosure 34 are closed by double flaps forming an air-lock. In the example of FIG. 2, the rear opening is closed by single flaps 7a, 7b and the forward opening by double flaps 6a, 6b, but the latter are coupled one to another in a particular way. It may prove more advantageous on the one hand to space the flaps apart in order to provide a space between them, and on the other hand to provide also double flaps for the rear opening.

In such manner and referring to FIG. 6, it may be seen that the forward opening is closed off by two flaps 46, followed by two other flaps 47, with a space 48 forming an air-lock between both pairs of flaps. Moreover, one may advantageously arrange, as is represented, outside flaps 46 which are longer than the inside flaps 47. The rear opening is closed off by flaps 49 and 50 identical to flaps 46 and 47 and forming between them a space 51 similar to space 48. With this arrangement, spaces 48 and 50 may play a role analogous to an air-lock, which considerably improves the tightness of enclosure 34 and provides a far greater efficiency to the partial vacuum effect and the air flow going across said enclosure under the effect of said partial vacuum.

Preferably, the lower flaps 11 are provided with notches, regularly spaced apart, which are overlapping one another. These notches may have any appropriate shape. According to an embodiment shown in FIGS. 4 to 6, the outside edge of flap 11 may have a sinusoidal contour in order to be formed with bosses and hollows, bosses of the flap 11a engaging the hollows of flap 11b and vice versa. With this arrangement, the losses of grape berries due to the falling to the ground of grape clusters or berries when flaps 11 draw apart from each other may be decreased and at the same time the tightness of enclosure 34 may be improved.

On the other hand, as is shown in FIGS. 4 and 6, flaps 11 are connected up to the forward and rear walls of support housings 1a and 1b in order to form scoops for avoiding any loss of grapes towards the front or towards the rear.

The partial vacuum enclosure 34 of the machine of FIGS. 4–6 being smaller than that of the machine described in FIGS. 1 and 2, it may be necessary to have only one ventilator 15. Referring to FIGS. 4, 5 and 9, it may be seen that said ventilator is situated above enclosure 34 within a hood 52.

FIGS. 10 to 13 show two alternative embodiments relative to closing means for the longitudinal horizontal lower opening of enclosure 34, means which in FIGS. 1, 2, 4, 5, 6, 7, 9 are formed by flaps 11.

Such closing means present in fact the major difficulty for all known grape gathering machines. In some machines, flexible flaps are used which are required contiguous but are in fact only more or less so. In other machines, two rows of oblique scales are used overlapping each other, pivotally mounted and held up by springs. In still other machines, two rows of discs are used, freely rotating, overlapping each other and mounted on pivoting arms, held up by springs.

None of these means gives full satisfaction and the crop losses due to the fall of grapes on the ground are substantial, while in addition some vines are damaged. On the other hand, with the known devices, all of the gathered and/or separated crop is not retained. The result is accumulations of grapes ending up by overflowing and falling on the ground.

Another disadvantage is due to the fact that when the closing means are made of separate mobile elements, a substantial quantity of juice leaks through said elements and falls on the ground.

According to the present invention, the closing means for the lower opening of the enclosure in which the grape berries are loose are made integral with the conveyer means, said means travelling at their lower portion in reverse direction to the machine.

Figures 10, 11:
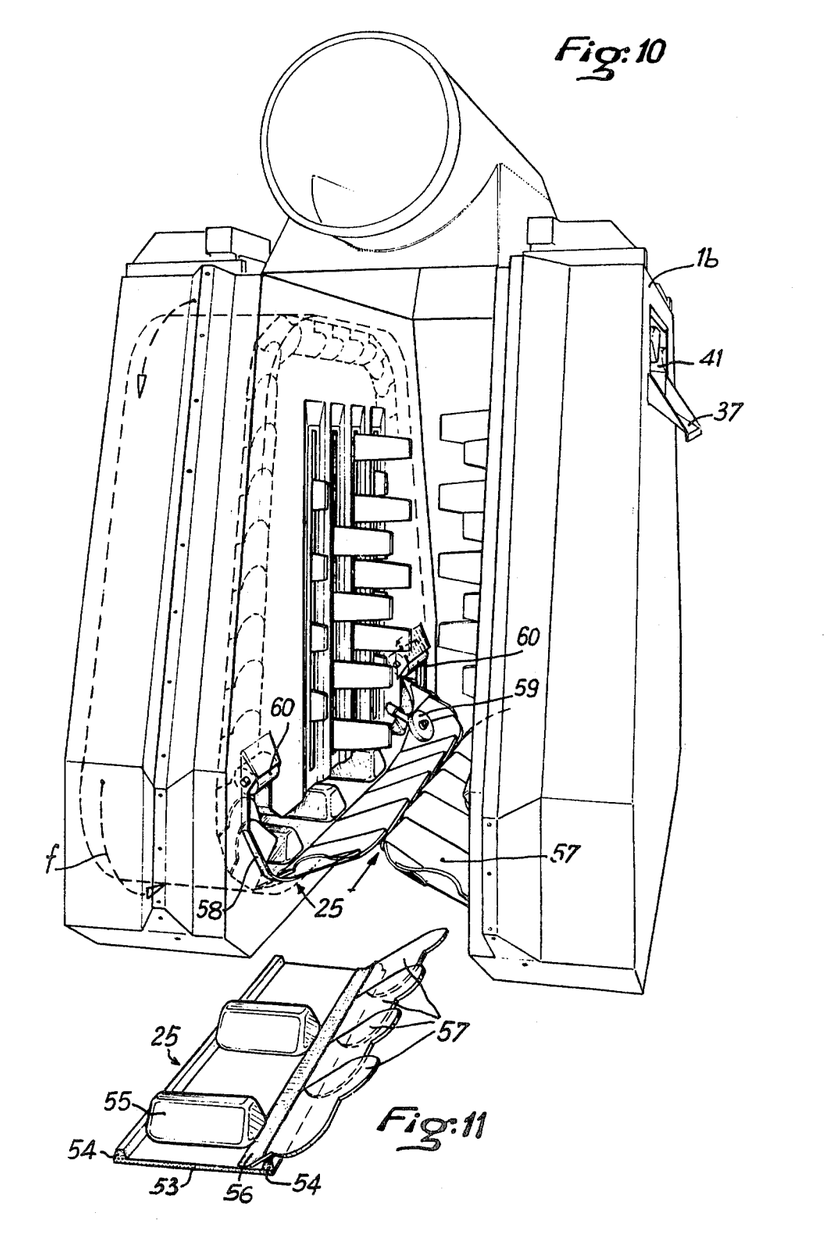
FIG. 10 is a perspective view of a second alternative embodiment.
FIG. 11 is an enlarged view of a detail of FIG. 10.
Figure 12:
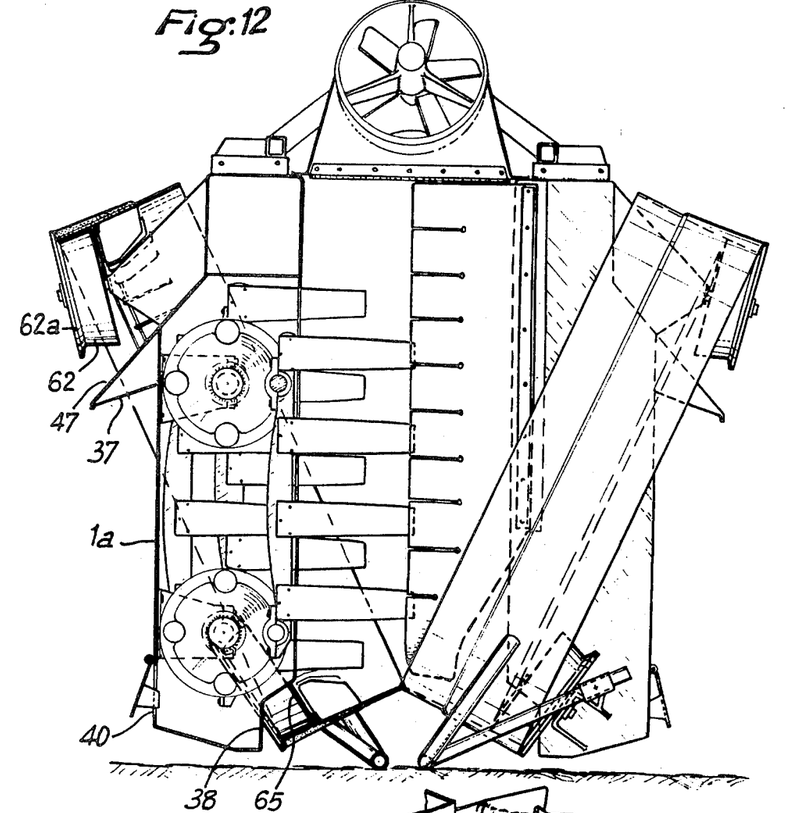
FIG. 12 is a front partial sectional view of a third alternative embodiment.
Figure 13:
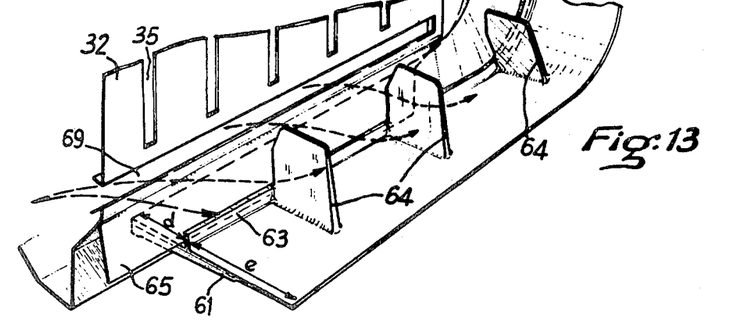
FIG. 13 is an enlarged view of a detail of FIG. 12.

FIGS. 10 and 11 show a first embodiment and FIGS. 12 and 13 a second embodiment. In FIG. 10, flaps 46 and 47 have been removed and for simplification of the drawing, the elements previously described have been represented schematically.

Reference being made to FIGS. 10 and 11, it may be seen that the bucket-conveyer is constructed in known manner with a flexible band 53 integral with two V-belts 54 between which are placed buckets 55, belt 54 being designed for moving around pulleys. Buckets 55 have a width which is smaller than the distance separating both belts 54 and are fixed against the outer belt, thus providing a space between the other end of bucket 55 and the inner belt 54. In this space is placed a flexible band 56 which is on the one hand integral with band 53 and on the other hand integral with a plurality of flexible plates 57 which overlap each other.

The flap-conveyer made in this way moves as pointed by arrows f, i.e. in its upper portion it travels in the direction of the forward movement of the machine and in its lower portion in reverse direction. Moreover, it is driven by means permitting regulation of its speed, for instance by a hydraulic motor, so that its speed will be equal to the forward movement speed of the tractor (or as close to it as possible) so that the articulated flaps will be practically motionless in relation to the stakes and vines. Any means of known type may advantageously be provided for synchronizing the speed of the flap-conveyer with the forward speed of the machine.

The flaps being articulated may tip in order to move inwardly of support housing. In order to be better guided, rails 58 have been provided outside and therebelow, on which the flaps ride as well as rollers 59 which maintain the flaps against the rails and rollers 60 which guide them when they move in and out of the shafts or areas defined by walls 39 (FIGS. 5 and 6).

Preferably, as is shown in FIG. 11, flaps 57 are formed with a protuberance such that flaps 57 on one side are interleaved with flaps 57 on the other side.

FIGS. 12 and 13 represent another embodiment. Reference being made to these Figures, it is seen that each support housing includes a device assuming on the one hand the function of crop conveyer and on the other hand the function of flaps. This device is made of a flexible band 61 winding around four pulleys 62, one on each corner of each support housing. The flexible band 61 is formed with a continuous rib 63 which is disposed on band 61 at a distance d which is slightly wider than the width of pulleys 62 in order to be able to move past said pulleys, and guide band 61 as is shown in FIG. 13. Pallets 64 are mounted at regular intervals perpendicularly to band 61 and to rib 63. Preferably, said pallets 64 are higher than rib 63 but narrower than the distance d separating said rib from the edge of the band.

Pulleys 62 are placed in such manner that the plane of each band 61 is oblique and that at the lower horizontal portion of their respective paths, bands 61 are contiguous and preferably slightly overlapping as is shown in FIG. 12. Preferably, in order to avoid that bands 61 escape from pulleys 62, the latter are conical and formed with a flange 62a. Preferably also, a metal sheet 65 is interposed between pulleys 62 and rib 63 in order to protect the latter.

As is the case in FIGS. 10 and 11, those of the pulleys 62 which are driving pulleys engage bands 61 in such manner that said bands move forward in the upper portion of their path and move rearwardly in the lower portion of their path, their linear speed being such that in their lower path they are motionless or practically motionless in relation to the stakes and the vines, when the grape gathering machine moves forward.

Thus, as the machine moves forward, the clusters of grapes and grape berries pulled off by the action of blades 21 fall onto band 61 and are carried or moved away by pallets 64. In the upward portion of the path of band 61, the crop is maintained thereon due to the obliqueness of the bands in the kinds of V-shaped bottom buckets formed by band 61, rib 63 and two pallets 64. In the upper horizontal portion of the path, the crop falls onto wall 37 and is evacuated through opening 41.

Due to the fact that the air-flow flowing through opening 40 cannot, as is the case in the preceding figures, flow between the buckets, the shape of wall 38 is modified in order to allow said air-flow to flow above rib 63 through an opening 69 formed in the lower portion of wall 32 (FIG. 13).

When a stake or a vine comes in contact, the part of band 61 between its edge and the extremity of pallet 64 is resiliently folded up. Although this is not shown, the bands may, as is previously explained in connection with FIGS. 4 and 5, be formed with notches so that both bands 61 interleave one another.

In the embodiments shown in FIGS. 4 to 13, two support housings 1a and 1b are hung on horizontal support member 2 by a triangular structure 66 to which they are connected by supports 67 so that the space separating them may be adjustable by bolts 68.

Moreover and as is apparent from FIGS. 6, 9 and 12, it may be advantageous to give blades 21 a length such that they overlap at the limit of their forward movement the intermediate vertical axis of the machine.

On the other hand all the crop mechanisms, that is the blades 21, their driving means 23-24, the flaps, the conveyers and the ventilator forming a compact unit, may be attached to a conventional high-clearance tractor such as those which are used for the soil cultivation of vines, their processing or their thinning. Such a unit may be mounted on the forward portion of the tractor, on the rear portion, on the side, or eventually in the middle. The unit may also be carried by a trailer coupled up at the rear of a tractor, and in this case said trailer may be in the form of a hoop straddling the vine and provided with wheels at its ends, said mechanical unit being hung to said hoop.

The invention is more particularly provided for the mechanical gathering of grapes, but it is obvious that it may be used for the gathering of any fruits in the form of berries carried by fruit shrubs having vegetation similar to that of vine. For instance, this machine may be used for the gathering of gooseberries, black-currents, raspberries, etc.

We claim:

1. A machine adapted for moving along a row of vines and for gathering from vegetation grapes or other types of berries, comprising:

at least one support housing formed with a front and rear generally vertical opening and a bottom opening through which the vegetation is to pass as the machine is moved along the row of vines;

a flexible flap means attached to said support housing to at least partially cover each of said openings to define with said support housing at least a partial enclosure into which the vegetation passes through said flap means;

ventilator means on said support housing for producing an air flow within said enclosure;

at least one comb means carried by a said support housing, said comb means including at least one elongated blade of flexible material which extends in a direction toward the vegetation and which is substantially flexible in the horizontal direction and substantially rigid in a vertical direction, drive means carried by said support housing for moving the comb means and the blades of each said comb means in a closed-curve path in a generally vertical plane substantially perpendicular to the row of vines and the direction of movement of the machine, into the vegetation, through the vegetation in a generally vertical direction to sever the vegetation and withdrawing from the vegetation, said blades flexing in the horizontal direction as they engage various parts of the vegetation while the machine is moved along a row of vines, and collector means carried by said support housing for collecting the severed vegetation.

2. A machine as in claim 1 wherein there are two said support housings, and support means for mounting said support housings face to face on each side of the same row of vegetation, the flexible flaps of the front, rear and lower openings of each said support housings being substantially contiguous to define at least a partial enclosure between the two support housings through which the vegetation can pass.

3. A machine as in claim 2 wherein each said support housing carries a separate ventilator means.

4. A machine as in claim 1 wherein the drive means for a said comb comprises a pair of rotatably mounted discs and connecting rod carried between said pair of rotatable discs.

5. A machine according to claim 1 wherein an air inlet means to the support housing is provided by an opening positioned at the lower portion of the support housing above the collector means, said opening extending along substantially the whole length of the support housing.

6. Machine according to claim 5 wherein each air inlet means is provided with an adjustable opening flap attached to said support housing.

7. A machine as in claim 1 wherein a said support housing is formed with a pair of generally vertical walls defining an enclosure therebetween, at least one generally vertically disposed slot in one of said walls through which the blades of a comb extend, said means for moving the comb means located within said enclosure.

8. A machine according to claim 7 wherein a said slot is formed as a reinforcement rib for a said wall.

9. A machine according to claim 7 wherein a said slot is provided on its rear side with means for guiding blades.

10. A machine according to claim 7 wherein a said wall is made of a plurality of boards placed in a generally parallel direction to each other and spaced a predetermined distance to define a slot for access for the blades.

11. Machine according to claim 10, wherein a said wall is formed with a cut out to provide a housing for the means for moving a said comb, said moving means cooperating with the boards for guiding the blades.

12. A machine according to claim 7, wherein the enclosure is surmounted by a ventilator.

13. A machine according to claim 7, wherein the blades protrude at their maximum point of advance into the enclosure, beyond the vertical intermediate plane of said enclosure.

14. A machine adapted for moving along a row of vines and for gathering from vegetation grapes or other types of berries comprising:

at least one support housing formed with a front and rear generally vertical opening and a bottom opening through which the vegetation is to pass as the machine is moved along a row of vines;

a flexible flap means attached to said support housing to at least partially cover each of said openings to define with said support housing at least a partial enclosure into which the vegetation passes through said flap means;

ventilation means on said support housing for producing an air flow within said enclosure;

at least one comb means carried by a said support housing, said comb means including at least one elongated blade of flexible material which extends in a direction toward the vegetation, drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation;

collector means carried by said support housing for collecting the severed vegetation; and a pair of oblique flaps attached to said support housing, for closing off said bottom opening, said oblique flaps lying one above the other, the extremity of the upper flap being above the extremity of the lower flap, said collector means being placed at the base of the lower flap.

15. A machine adapted for moving along a row of vines and for gathering from vegetation grapes or other types of berries comprising:

at least one support housing formed with a front and rear generally vertical opening and a bottom opening through which the vegetation is to pass as the machine is moved along a row of vines;

a flexible flap means attached to said support housing to at least partially cover each of said openings to define with said support housing at least a partial enclosure into which the vegetation passes through said flap means;

ventilation means on said support housing for producing an air flow within said enclosure;

at least one comb means carried by a said support housing;

said comb means including at least one elongated blade of flexible material which extends in a direction toward the vegetation, drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation;

collector means carried by said support housing for collecting the severed vegetation; and at least one guide means of adjustable length at the lower part of the support housing for guiding the vegetation into said partial enclosure as the machine is moved along the row of vegetation.

16. A machine as in claim 15 which comprises a single said support housing, means located offset of the row of vegetation for suspending said support housing, said support housing thereby tipping laterally and said guide means contacting the vegetation.

17. A machine adapted for moving along a row of vines and for gathering from vegetation grapes or other types of berries comprising:

a pair of support housings each formed with a front and rear generally vertical opening and a bottom opening, through which the vegetation is to pass as the machine is moved along a row of vines, support means for mounting said support housings face to face on opposite sides of the same row of vegetation, each said support housing having a generally trapezoidal shape, both trapezoidal shaped support housings being generally parallel to the row of vegetation which they encompass, a flexible flap means attached to said support housings to at least partially cover each of said openings of each of said support housings, said flap means being substantially contiguous to define with said support housing at least a partial enclosure into which the vegetation passes through said flap means;

ventilation means on said support housing for producing an air flow within said enclosure;

at least one comb means carried by a said support housing, said comb means including at least one elongated blade of flexible material which extends in a direction toward the vegetation, drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation;

collector means carried by said support housing for collecting the severed vegetation.

18. A machine adapted for moving along a row of vines and for gathering from vegetation grapes or other types of berries comprising:

at least one support housing formed with a front and rear generally vertical opening and a bottom opening through which the vegetation is to pass as the machine is moved along a row of vines;

a flexible flap means attached to said support housing to at least partially cover each of said openings to define with said support housing at least a partial enclosure into which the vegetation passes through said flap means;

ventilation means on said support housing for producing an air flow within said enclosure;

at least one comb means carried by a said support housing, said comb means including at least one elongated blade of flexible material which extends in a direction toward the vegetation, drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation; and conveyor means carried by said support housing for collecting the severed vegetation, said conveyor means extending around said comb means and said comb moving means.

19. A machine according to claim 18 wherein the path of the conveyer means is isolated from the portion of the support housing containing the comb moving means by means of an upper inclined wall formed on said support housing acting as overflow-chute and communicating with an evacuation opening for the severed vegetation, said support housing also formed with a lower wall forming an air inlet opening and two lateral walls forming upward and downward shafts.

20. A machine according to claim 19, wherein the walls forming the shafts have a profile conforming to that of the conveyor means to reduce air intake into said shafts.

21. A machine according to claim 19, wherein the air inlet opening formed by said lower wall extends along substantially the entire length of the lower path of the conveyer.

22. A machine according to claim 19, wherein the air inlet opening is situated at the level of the conveyor means.

23. A machine according to claim 19 wherein said upper inclined wall acting as overflow-chute lies above said evacuation opening in said support housing.

24. A machine according to claim 23 wherein said conveyor means comprises a continuous conveyor the major portion of which is situated below said overflow-chute and having a portion which is situated above said overflow-chute from which the severed berries are placed into the overflow-chute.

25. A machine according to claim 23 further comprising means on a said support housing for hanging and supporting a removable basket below the overflow-chute.

26. A machine adapted for moving along a row of vines and for gathering from vegetation grapes or other types of berries comprising:
   at least one support housing formed with a front and rear generally vertical opening and a bottom opening through which the vegetation is to pass as the machine is moved along a row of vines;
   flexible flap means attached to said support housing to at least partially cover each of said openings to define with said support housing at least a partial enclosure into which the vegetation passes through said flap means, said flap means at the front and rear openings fromed by two pairs of flexible flaps with the flaps of a respective pair being separated from each other by a space serving as an air lock,
   ventilation means on said support housing for producing an air flow within said enclosure;
   at least one comb means carried by a said support housing, said comb means including at least one elongated blade of flexible material which extends in a direction toward the vegetation,
   drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation;
   collector means carried by said support housing for collecting the severed vegetation.

27. A machine according to claim 26 wherein the outside flaps of a said pair of flaps are wider than the corresponding inside flaps.

28. A machine according to claim 26 wherein the flaps in the front and rear openings are strips of material having slits formed therein.

29. A machine adapted for moving along a row of vines and for gathering from vegetation grapes or other types of berries comprising:
   a pair of support housings each formed with a front and rear generally vertical opening and a bottom opening through which the vegetation is to pass as the machine is moved along a row of vines; support means for mounting said support housings face to face on opposite sides of the row of vegetation,
   flexible flap means attached to said support housing to at least partially cover each of said openings and being substantially contiguous to define with said support housing at least a partial enclosure between the two support housings into which the vegetation passes through said flap means, the flaps of the lower opening of each said support housing being formed with notches, the notches of one said flap being offset in relation to the notches of the other said flap so that both flaps are interleaved,
   ventilation means on said support housing for producing an air flow within said enclosure;
   at least one comb means carried by a said support housing, said comb means including at least one elongated blade of flexible material which extends in a direction toward the vegetation,
   drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation;
   collector means carried by said support housing for collecting the severed vegetation.

30. A machine according to claim 9, wherein the edges of the flaps are cut out in a shape substantially that of a sine curve.

31. A machine according to claim 29 wherein both ends of each flap are connected to the respective support housing to define a scoop for retaining the vegetation.

32. A machine adapted for moving along a row of vines and for gathering from vegetation grapes or other types of berries comprising:
   at least one support housing formed with a front and rear generally vertical opening and a bottom opening through which the vegetation is to pass as the machine is moved along a row of vines;
   a flexible flap means attached to said support housing to at least partially cover each of said openings to define with said support housing at least a partial enclosure into which the vegetation passes through said flap means;
   ventilation means on said support housing for producing an air flow within said enclosure;
   at least one comb means carried by a said support housing, said comb means including at least one elongated blade of flexible material which extends in a direction toward the vegetation,
   drive means for moving the comb means and the blades of each said comb means in a closed-curve path in a generally vertical plane substantially perpendicular to the row of vines, into the vegetation, through the vegetation in a generally vertical direction to sever the vegetation and withdrawing from the vegetation; and
   collecting means carried by said support housing for collecting the severed vegetation, said collector means located at the lower opening of said enclosure, means for moving said collecting means along said bottom opening in a direction opposite to that of the movement of the support housing along the row of vegetation and at substantially the same speed as the support housing so that said collecting means is substantially motionless in relation to the vegetation.

33. A machine according to claim 32 wherein the flexible flaps closing said bottom opening of said support housing includes flexible plates overlapping each other, said flexible plates being connected by a flexible attachment to said collecting means for the vegetation.

34. A machine according to claim 33, wherein said support housing comprises at each end forward and rear of the lower path of the collecting means, guide means including support rails and pressure rollers, said guide means acting to unfold the plates at the beginning of their path through the enclosure and to fold them up at the end of said path.

35. A machine according to claim 32, wherein the means for closing the lower opening and the collecting means comprise two oblique units carried by said support housing which are contiguous at their horizontal and parallel bases, each unit including a continuous band running around a plurality of pulleys, said band comprising a longitudinal rib and a series of spaced and generally parallel pallets which are connected to said band and said rib.

36. A machine according to claim 35, wherein the pallets have a height greater than that of the rib and a width less than the distance separating said rib and the edge of said band.

37. A machine according to claim 36, wherein the rib is situated at a distance of the band edge of the side opposite to the pallet substantially equal to the width of the pulleys.

38. A machine according to claim 35, wherein at least some of the pulleys have a truncated conical surface and are formed with an abutment flange at the top of the truncated cone.

39. A machine according to claim 32 wherein the closing means and the collecting means include means for driving them in synchronism with the forward speed of the machine.

* * * * *